(12) United States Patent
Singhal

(10) Patent No.: US 12,081,391 B2
(45) Date of Patent: Sep. 3, 2024

(54) SINGLETON MICRO-SERVICE HIGH AVAILABILITY

(71) Applicant: Parallel Wireless, Inc., Nashua, NH (US)

(72) Inventor: Mukesh Singhal, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 18/148,432

(22) Filed: Dec. 29, 2022

(65) Prior Publication Data

US 2023/0208704 A1 Jun. 29, 2023

Related U.S. Application Data

(60) Provisional application No. 63/294,443, filed on Dec. 29, 2021.

(51) Int. Cl.
*H04L 41/0668* (2022.01)

(52) U.S. Cl.
CPC ............... *H04L 41/0668* (2013.01)

(58) Field of Classification Search
None
See application file for complete search history.

(56) References Cited

U.S. PATENT DOCUMENTS

| | | | |
|---|---|---|---|
| 11,652,909 B1 * | 5/2023 | Tang | H04L 67/145 709/227 |
| 2016/0127169 A1 | 5/2016 | Rosa de Sousa Teixeira et al. | |
| 2018/0376338 A1 | 12/2018 | Ashrafi | |
| 2020/0042365 A1 | 2/2020 | Tanna et al. | |
| 2021/0208961 A1 * | 7/2021 | Dutta | G06F 11/0772 |
| 2022/0083437 A1 * | 3/2022 | Zou | G06F 11/1438 |
| 2022/0164186 A1 * | 5/2022 | Pamidala | G06F 18/2155 |
| 2022/0191168 A1 * | 6/2022 | Snehashis | H04L 41/22 |

OTHER PUBLICATIONS

Jack Jia, "Building Unified PaaS Architecture for Agile Development," Apr. 7, 2017, Huawei Technologies Co., Ltd.
"Enterprise Service Bus," Wikipedia, the free encyclopedia, Retrieved Jul. 30, 2018.
Jorg Niemoller, Ioannis Fikouras, Frans De Rooij, Lucas Klostermann, Ulf Stringer, Ulf Olsson, "Ericsson Composition Engine—Next-generation IN," Jan. 2009, Ericsson Review (English Edition).
Falko Menge, "Enterprise Service Bus," Free and Open Source Software Conference 2007.
"Etisalat Transforms BBS With Ericsson," Dec. 18, 2013, Light Reading, an Informa business, trading within KNect365 US, Inc.

(Continued)

*Primary Examiner* — Mohamed Ibrahim
(74) *Attorney, Agent, or Firm* — Michael Y. Saji

(57) ABSTRACT

A method is disclosed for providing singleton micro-service high availability, comprising: identifying, by an internal controller, that a pod/container has crashed; initiating, by the internal controller, a label change for an existing similar pod labeled as standby to active; matching a singleton micro-service selector label criterion; advertising the newly relabeled existing similar pod as part of a singleton micro-service; and receiving, by the newly relabeled pod in the system, traffic directed on an IP address of the singleton micro-service.

18 Claims, 6 Drawing Sheets

(56) References Cited

OTHER PUBLICATIONS

Jeffery Vogel, Michael Stricklen, "How Loosely Coupled Architectures are Helping the Modernization of Legacy Software," Oct. 2, 2017, EYGM Limited (Formerly Bulger Partners).
"Loose Coupling," Wikipedia, the free encyclopedia, Retrieved Jul. 30, 2018.
Jurgen Kress, Berthold Maier, Hajo Normann, Danilo Schmeidel, Guido Schmutz, Bernd Trops, Clemens Utschig-Utschig, Torsten Winterberg, "Enterprise Service Bus," Jul. 2013, Oracle Technical Resources (Formerly Oracle Technology Network).
Richard Watson, "How to Architect and Design Cloud-Native Applications," Dec. 29, 2015, Gartner Research, ID G00296114, retrieved from https://www.gartner.com/en/documents/3181919.
"ICT Platform for Digital Communication Providers," Sep. 2, 2015, Ericsson and TIBCO Software, Inc.

* cited by examiner

SINGLETON MICRO-SERVICE HIGH AVAILABILITY

CROSS-REFERENCE TO RELATED APPLICATIONS

This application claims priority under 35 U.S.C. § 119(e) to U.S. Provisional Pat. App. No. 63/294,443, filed Dec. 29, 2021, titled "Singleton Micro-Service High Availability," which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety 71721US01, 71729US01, 71730US01, 71731US01, 71756US01, 71775US01, 71865US01, and 71866US01, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety. This document also hereby incorporates by reference U.S. Provisional Pat. App. No. 63/124,293, filed Dec. 11, 2020, titled "Continuously Evolving Network Infrastructure with Real-Time Intelligence," in its entirety.

BACKGROUND

To provide 99.999%-time availability of 5G/4G products or any other product & services, it is a basic requirement in public cloud/private cloud or bare metal environment. Micro-service architecture is suitable for solving problems of scaling/load distribution & high-availability for web-world product & services. High-availability of micro-service with single brain/single pod in milli-seconds to seconds is needed.

As of today, there cannot be active/passive POD possible in given micro-service as this is not provided by cloud providers. All PODs in given micro-service are always active. In a given product/service, it is desirable to have single brain active to avoid split brain problem. Singleton micro service will have only one serving POD at any given time. If container/task in that POD fails, then it can disrupt overall high availability of complete product. There is need to have high availability for singleton micro-service, ideally in milliseconds to seconds to provide a highly available system.

SUMMARY

This disclosure proposes a method for providing high availability within pod-based cloud deployment architectures for telecom infrastructure services.

In one embodiment, a method is disclosed for providing singleton micro-service high availability, comprising: identifying, by an internal controller, that a pod/container has crashed; initiating, by the internal controller, a label change for an existing similar pod labeled as standby to active; matching a singleton micro-service selector label criterion; advertising the newly re-labeled existing similar pod as part of a singleton micro-service; and receiving, by the newly relabeled pod in the system, traffic directed on an IP address of the singleton micro-service.

DETAILED DESCRIPTION

Figure 1:
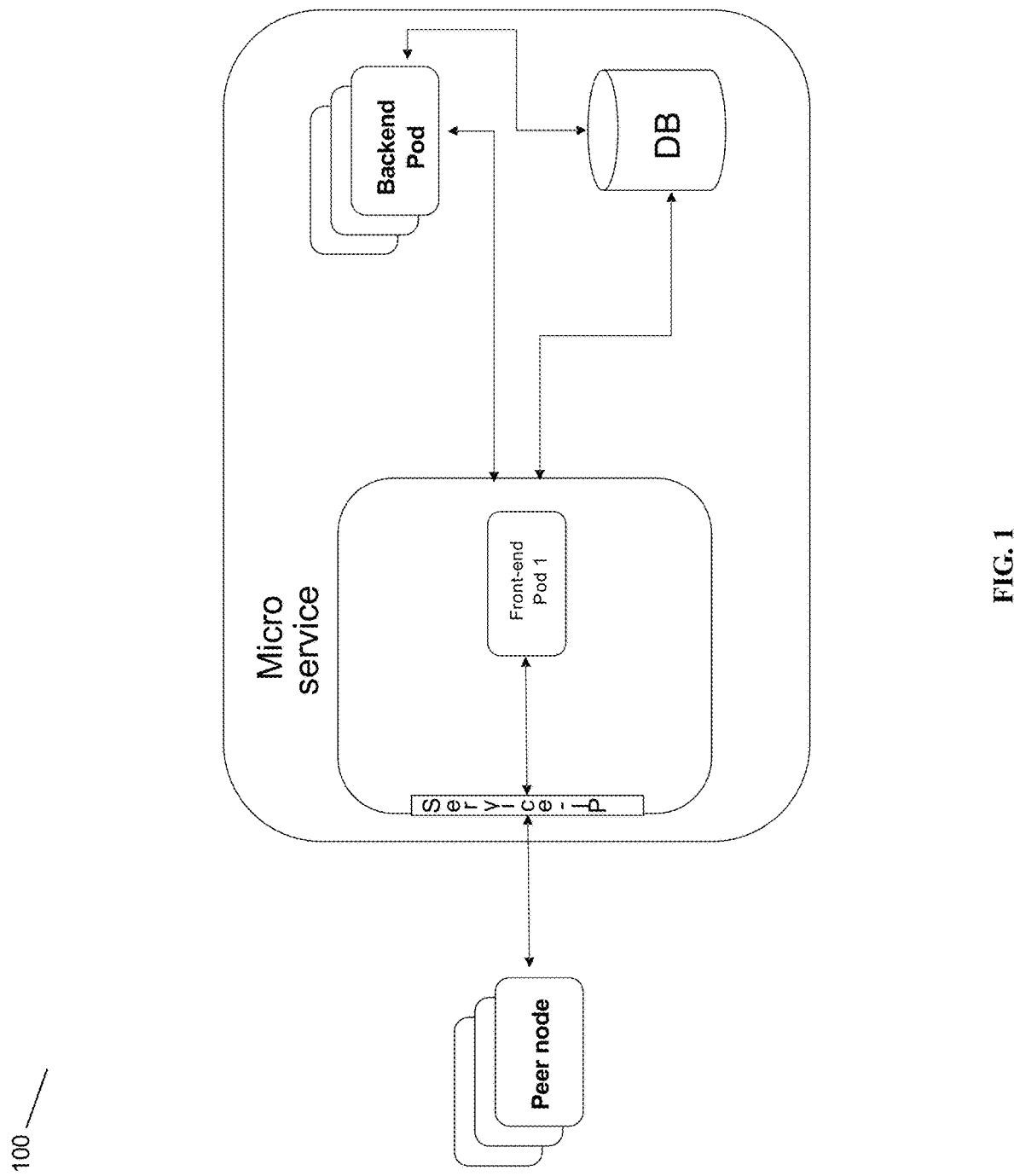
FIG. 1 is a schematic diagram showing a microservice logical architecture, in accordance with some embodiments.

In a cloud distributed architecture, pod & services life is transient. IP address of pods for internal communication are dynamically allocated at pod bring up. Number of pods vary based on load conditions in network. pods and service bring up sequence is dependent on of orchestrator and cloud resources. There is lot of dynamism in cloud deployments.

A product/service may be made up of multiple distinct microservices, pods and multiple interfaces to outside world. All the pods and micro services combined together provides some network function to outside world. It is desirable to identify set of pods and microservices available in given deployment dynamically.

Multiple services and worker pods stitched together to provide common function, may not be known to cloud providers. Load balancer microservices available today are very limited to few protocols only. Not all protocol are stateless, hence dynamic changes in internal environment are desired to be discovered and advertised in a matter of few milliseconds.

It is desirable to know if any changes like new Pod's creation and deletion or services added in our network function dynamically in matter of few milliseconds. Based on dynamic learning, our solution can adjust to new information and start making required changes in system seamlessly.

In the present disclosure, a pod is a group of one or more containers, which may have shared storage and network resources, and which may also have a specification for how to run the containers. A pod's contents may be co-located and co-scheduled, and run in a shared context. A pod may be an application-specific logical host, or may be non-application specific. In some embodiments, applications may be executed on different or the same physical or virtual machine. In some embodiments, applications may be cloud applications executed on the same logical host, or executed at a different location. Where pods and/or containers are described herein, various alternatives are also considered, such as Linux containers, Kubernetes containers, Microsoft Azure, or other cloud-based software technologies.

It is typical for multiple microservices and multiple types of pod combined together forming a single product deployment. Each inbound interface is handled by a microservice, for example, the E1 interface with CU-UP is handled by a E1-AP demux/microservice, and the NG interface with AMF+SMF is handled by an NGAP demux/microservice, and so on. Microservices being brought up and taken down in this way are able to handle demands flexibly and quickly, and react in a matter of milliseconds. The microservices shown are located inside the logical boundary of the pod.

Public cloud/private cloud system may take some time identify the pod/container failure & instantiation of pod/container may take tens of seconds to minutes depending on size of public/private cloud cluster.

For singleton micro-service, there is no proper framework/mechanism to provide high availability of services let's say in few milli-seconds to seconds in deterministic way.

Singleton micro-service or micro-service which requires single pod to handle events from internal/external interface should ideally be highly available. If there is no time constraints for bringing up the micro-service or pod then existing solution can bring up the micro-service or pod which has gone down. But these solutions are not sufficient and may not meet 99.9999% uptime for services.

With internal service discovery framework depicted in following diagram, internal controller may keep track of internal changes in given namespace/cluster.

FIG. 1 is a schematic diagram showing a pod microservice internal discovery logical architecture, in accordance with some embodiments. Within a single microservice, the database hosts a service registry, while a controller performs service distribution. A front-end microservice pod serves to terminate the front end protocols and communicate with other microservices/pods, and a group of backend pods to service these microservices serves as a set of worker back-end pods. Although multiple front-end pods are possible, the inventors have contemplated the benefit of providing high availability for a single front-end pod, for reasons as disclosed elsewhere herein.

Figure 2:
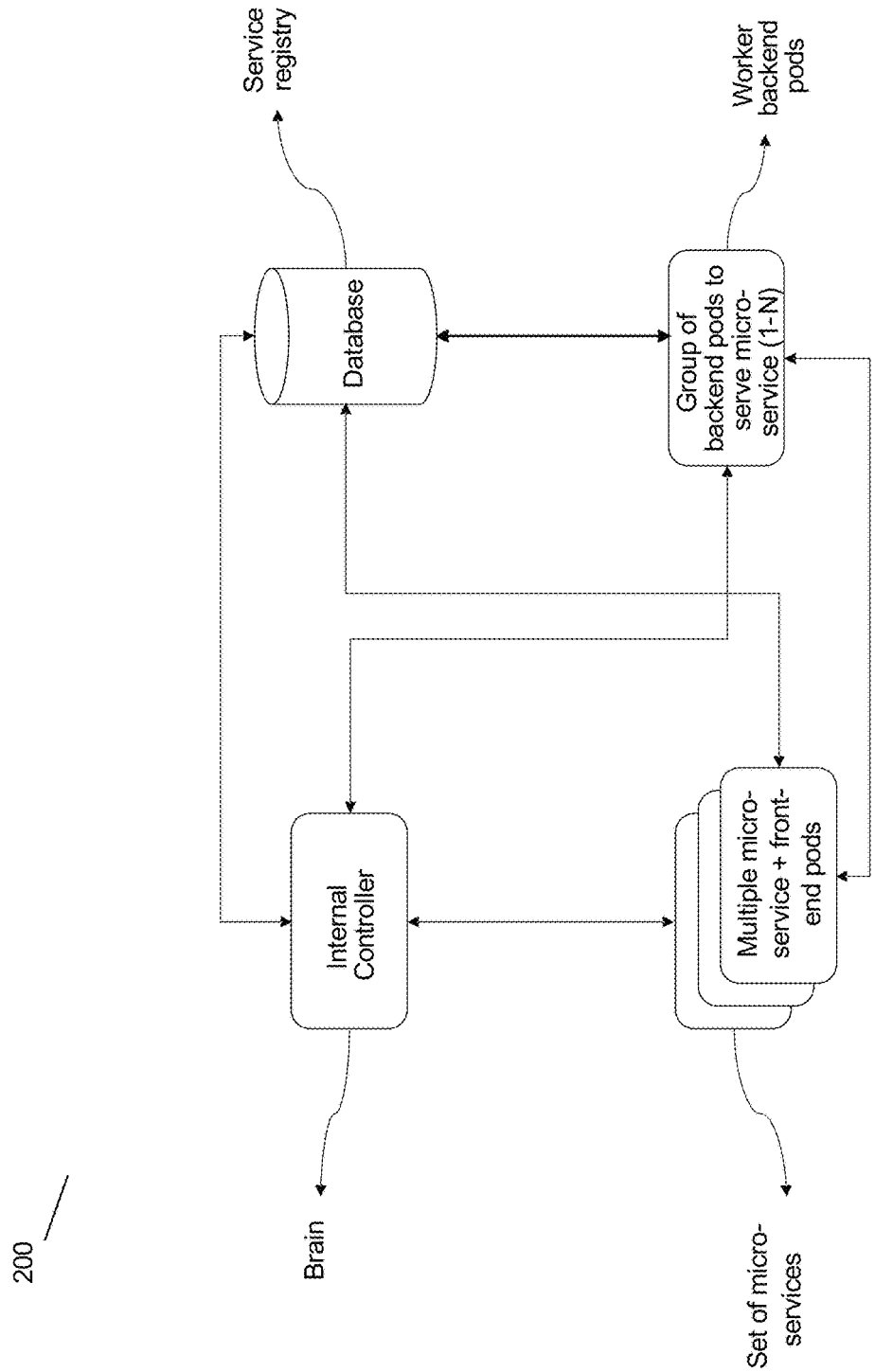
FIG. 2 is a schematic diagram showing a microservice logical architecture with front and back-end pods, in accordance with some embodiments.

FIG. 2 is a schematic diagram showing a pod microservice logical architecture with front and back-end pods, in accordance with some embodiments. A plurality of front-end pods for terminating connections and back-end pods for handling and processing traffic is in communication with a database; the database handles registration of the pods as described below. Other nodes, such as peer nodes, interface with the microservice via a particular service IP, and routing is performed within the microservice to the front end pods and back end pods, in some embodiments by a routing pod.

In some embodiments, an internal controller keeps track of health of some or all pods & micro services in a given namespace. As soon as any pod/container crashes, it updates the remaining pods. And takes necessary steps to bring system in workable state.

In some embodiments, a database (Service registry) may act as service registry database for some or all pods and micro-service in given namespace. All the pods on start-up can update required information in database & fetch required information from service registry database.

Singleton microservice high availability is intended to enhance availability of a single pod solution, as follows.

In Kubernetes, a Pod (as in a pod of whales or pea pod) is a group of one or more containers, with shared storage and network resources, and a specification for how to run the containers. A Pod's contents may be co-located and co-scheduled, and run in a shared context. A Pod models an application-specific "logical host": it contains one or more application containers which are relatively tightly coupled. In non-cloud contexts, applications executed on the same physical or virtual machine are analogous to cloud applications executed on the same logical host. Pods get their own IP and services get a cluster IP. Cluster IP is internal only. Kubernetes creates a cluster when a pod is created. Kubernetes supports a method for tracking which pods are available and/or down. It tracks which ones are live and which ones are down. While Kubernetes is described herein, other container management and orchestration methods are understood to be supported in the spirit of the present disclosure.

Pods are configured in Kubernetes using YAML files. A controller for the resource handles replication and rollout and automatic healing in case of Pod failure. For example, if a Node fails, a controller notices that Pods on that Node have stopped working and creates a replacement Pod. The scheduler places the replacement Pod onto a healthy Node.

In telecom, it is desirable to have a single controller running at a single time, not multiple controllers. This is because there are often situations where state is required to be kept at the service provider. This results in a single controller being visible, and, standby controller being invisible to others. However, Kubernetes does not have any concept of active and standby, and this concept is facilitated by the addition of labels or selectors as follows.

In Operation

To facilitate a single controller with high availability, in this disclosure, the approach is as follows. In some embodiments, one pod is labeled as standby using the Kubernetes Selector parameter, which is shared via the Kubernetes service advertisement infrastructure. The selector is a free text field that accepts key-value pairs, in some embodiments. The controller is aware of it. The controller defines the service using a service spec selector, such that if the selector is set to "active," the pod is added to the service.

A label or selector (these terms are used interchangeably herein) may be a key/value pair attached to an object, such as a pod. These labels can be attached, added, modified, and/or deleted from the target object at various times, including creation and at arbitrary times. Each key may be unique for a given object, in some embodiments. Labels may be hierarchical, in some embodiments. Pattern matching may be used, including regular expression matching, to match labels and perform attendant functions in accordance with the present disclosure, in some embodiments. Regular Kubernetes procedures may be used to perform label modification, in accordance with some embodiments. Equivalent features of other container-based architectures may be used, in accordance with some embodiments.

In operation, when controller detects a crash with the singleton microservice, it changes the label of the standby pod to "active," which redirects traffic to the standby pod. Externally we may still use IP B, but internally we can use IP A, in some embodiments.

Figure 3:
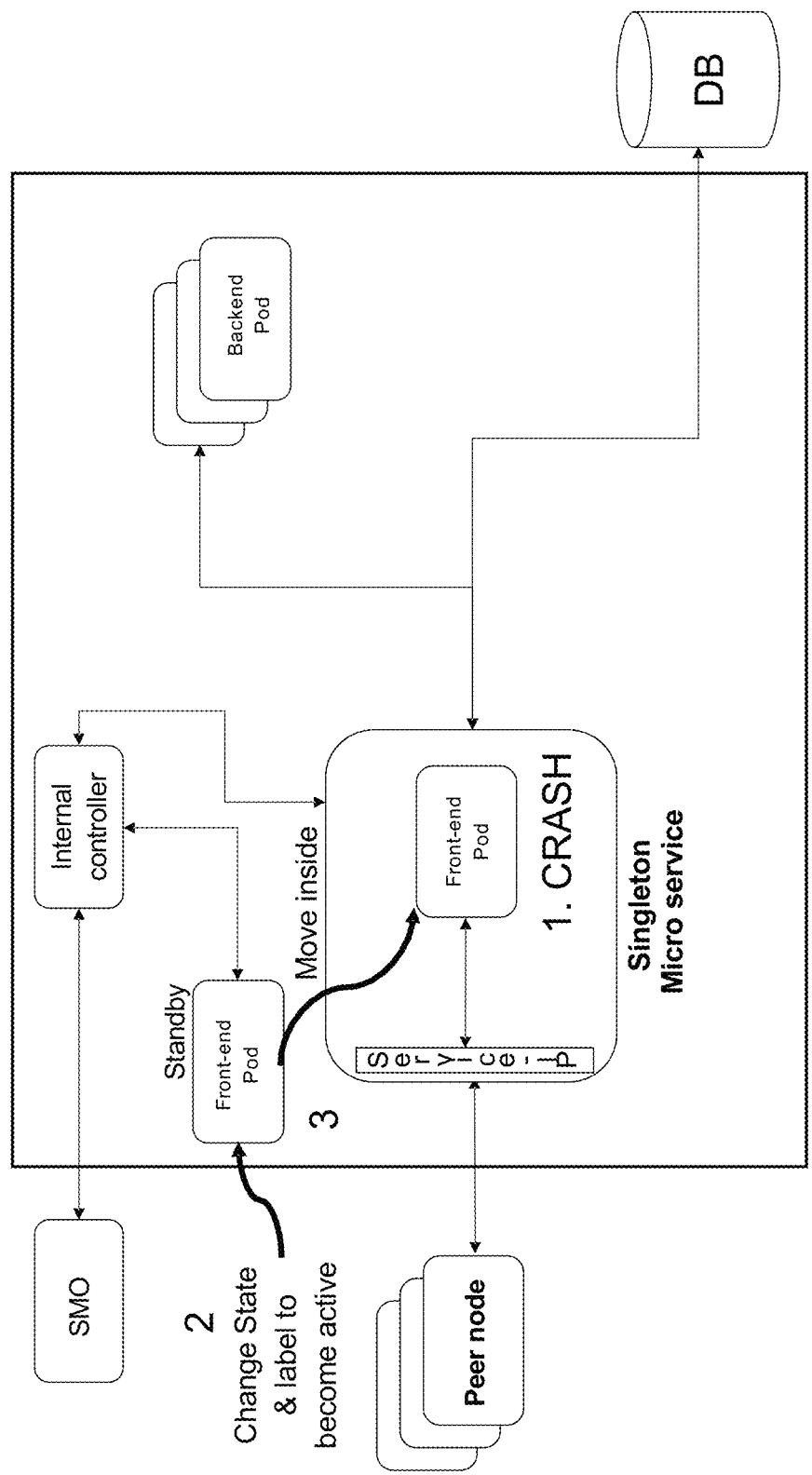
FIG. 3 is a schematic diagram showing a microservice logical architecture and showing a crash, in accordance with some embodiments.

FIG. 3 is a schematic diagram showing a microservice logical architecture and showing a crash, in accordance with some embodiments. As depicted in FIG. 3, at the time that a pod/container crashes, the internal controller may identify the failure based on heartbeat failure. Internal controller may initiate label change for existing similar pod labeled as standby to active. This change can be done very quickly via multiple ways. Singleton micro-service selector label criteria may match, and newly labelled active pod may become part of singleton micro-service. Hence any traffic directed on micro-service IP may be received by newly active pod in the system.

Task/container/pod startup & Registry. As soon as container/task in pod comes up, It may register its credential like {namespace, microservice name, application-name, pod-name, IP-address, port, status, function-name, label, etc. . . . } in database. If Database service is not up, Container running on pods will keep trying till it succeed. Without updating information in database, Network function will not come up as internal task/pods are unaware of other microservices in deployment.

Task/container Internal Service discovery. Once pod/container information is updated in database, it would fetch information all the container information updated in database. In some embodiments the database may be a distributed database. In some embodiments the container information may update periodically, such as at one or more of system start, system reconfiguration, fixed or variable periodicity, and manual push.

Task/container Announcement may be performed as follows. Once it learns information required, Container/Task in given pod can send messages to Controller-Task and all other task to register itself. Newly created container/pod will start heart-beat messaging with Controller-task periodically.

Task/container Death notification may be performed as follows. Control task would identify if heartbeat not received from configurable times from some active pod/container/tasks. it would declare specific pod/container/task as dead and update the status of pod/container/task in register and advertise internally to all the required pods in given deployment/namespace.

In some embodiments, Steps for registration/announcement are as follows. Each Container/Task comes up with configured microservice name or IP of central database. Resolve database microservice using FQDN; update the database with new container/task state and relevant information in database; newly arrived pod will fetch information of the container/task/pods and services from central database whatever records available; the newly arrived pod may announce/register itself with other container/pods in system based on flow; and the newly arrived pod may start periodic heartbeat with controller.

Figure 4:
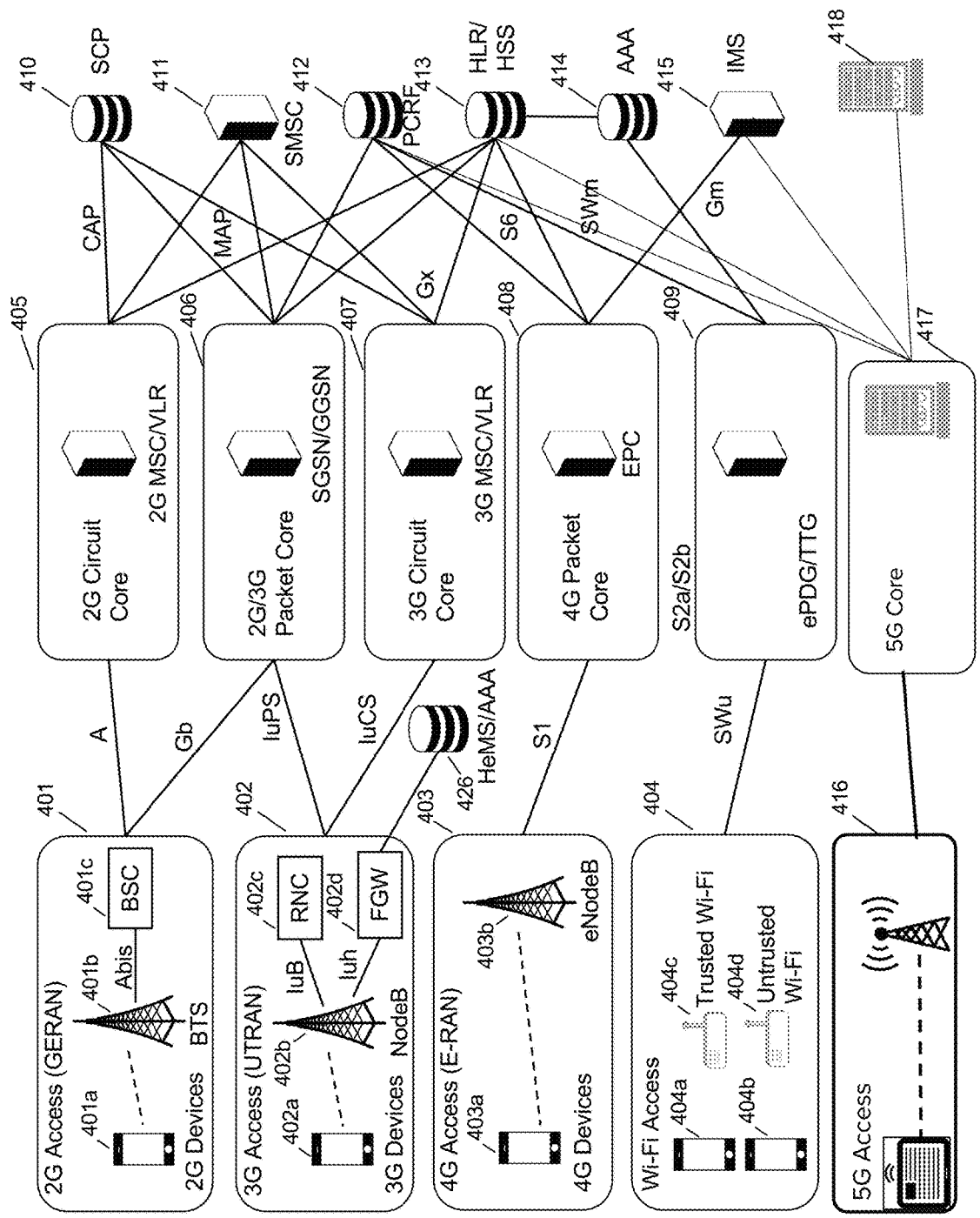
FIG. 4 is a schematic network architecture diagram for 3G and other-G prior art networks.

FIG. 4 is a schematic network architecture diagram for 3G and other-G prior art networks. The diagram shows a plurality of "Gs," including 2G, 3G, 4G, 5G and Wi-Fi. 2G is represented by GERAN 401, which includes a 2G device 401a, BTS 401b, and BSC 401c. 3G is represented by UTRAN 402, which includes a 3G UE 402a, nodeB 402b, RNC 402c, and femto gateway (FGW, which in 3GPP namespace is also known as a Home nodeB Gateway or HNBGW) 402d. 4G is represented by EUTRAN or E-RAN 403, which includes an LTE UE 403a and LTE eNodeB 403b. Wi-Fi is represented by Wi-Fi access network 404, which includes a trusted Wi-Fi access point 404c and an untrusted Wi-Fi access point 404d. The Wi-Fi devices 404a and 404b may access either AP 404c or 404d. In the current network architecture, each "G" has a core network. 2G circuit core network 405 includes a 2G MSC/VLR; 2G/3G packet core network 406 includes an SGSN/GGSN (for EDGE or UMTS packet traffic); 3G circuit core 407 includes a 3G MSC/VLR; 4G circuit core 408 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 430, the SMSC 431, PCRF 432, HLR/HSS 433, Authentication, Authorization, and Accounting server (AAA) 434, and IP Multimedia Subsystem (IMS) 435. An HeMS/AAA 436 is present in some cases for use by the 3G UTRAN. The diagram is used to indicate schematically the basic functions of each network as known to one of skill in the art, and is not intended to be exhaustive. For example, 5G core 417 is shown using a single interface to 5G access 416, although in some cases 5G access can be supported using dual connectivity or via a non-standalone deployment architecture.

Noteworthy is that the RANs 401, 402, 403, 404 and 436 rely on specialized core networks 405, 406, 407, 408, 409, 437 but share essential management databases 430, 431, 432, 433, 434, 435, 438. More specifically, for the 2G GERAN, a BSC 401c is required for Abis compatibility with BTS 401b, while for the 3G UTRAN, an RNC 402c is required for Tub compatibility and an FGW 402d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 5:
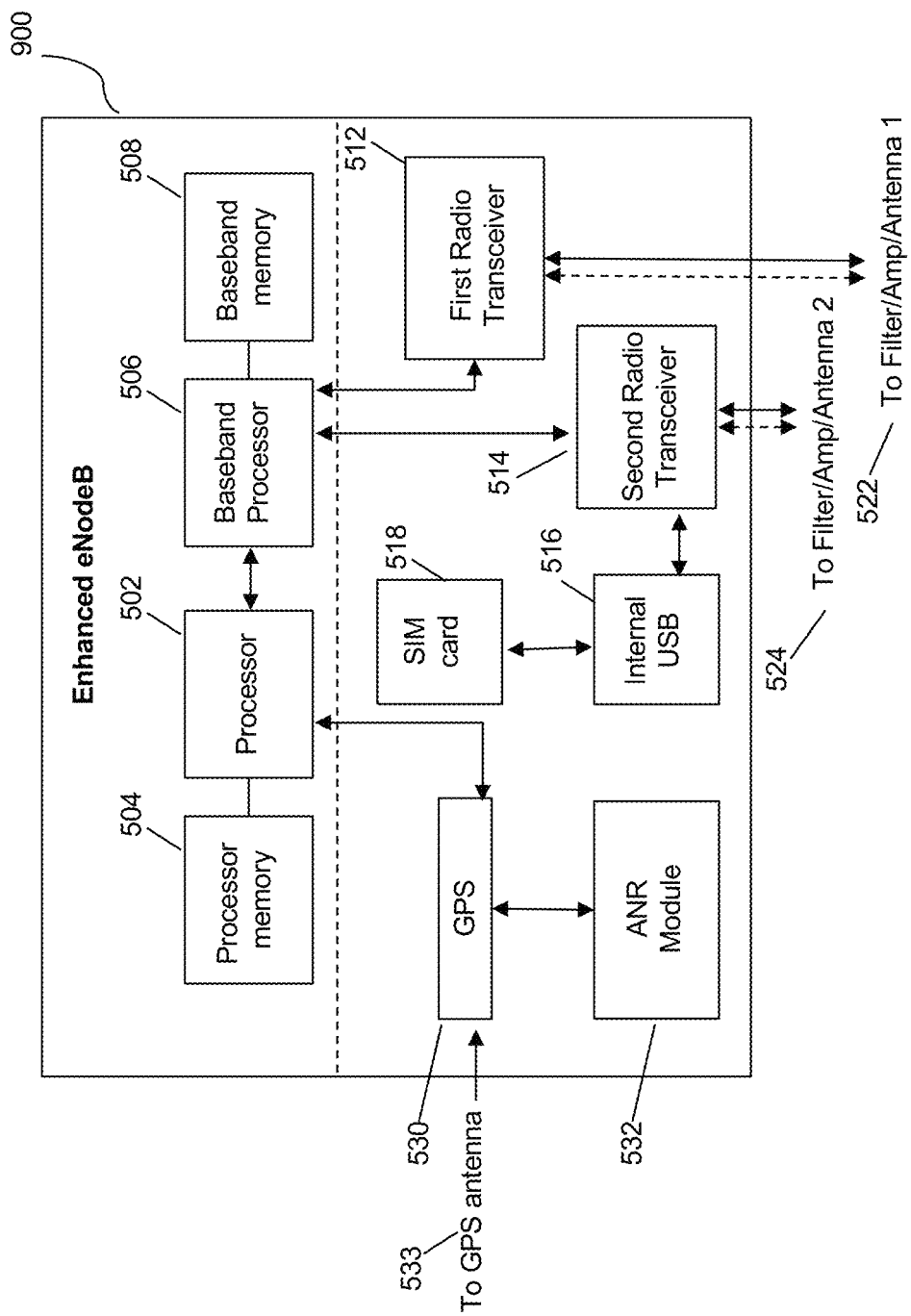
FIG. 5 is an enhanced eNodeB for performing the methods described herein, in accordance with some embodiments.

FIG. 5 is an enhanced eNodeB for performing the methods described herein, in accordance with some embodiments. eNodeB 500 may include processor 502, processor memory 504 in communication with the processor, baseband processor 506, and baseband processor memory 508 in communication with the baseband processor. Mesh network node 500 may also include first radio transceiver 512 and second radio transceiver 514, internal universal serial bus (USB) port 516, and subscriber information module card (SIM card) 518 coupled to USB port 516. In some embodiments, the second radio transceiver 514 itself may be coupled to USB port 516, and communications from the baseband processor may be passed through USB port 516. The second radio transceiver may be used for wirelessly backhauling eNodeB 500.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 512 and 514. Baseband processor 506 may use memory 508 to perform these tasks.

The first radio transceiver 512 may be a radio transceiver capable of providing LTE eNodeB functionality, and may be capable of higher power and multi-channel OFDMA. The second radio transceiver 514 may be a radio transceiver capable of providing LTE UE functionality. Both transceivers 512 and 514 may be capable of receiving and transmitting on one or more LTE bands. In some embodiments, either or both of transceivers 512 and 514 may be capable of providing both LTE eNodeB and LTE UE functionality. Transceiver 512 may be coupled to processor 502 via a Peripheral Component Interconnect-Express (PCI-E) bus, and/or via a daughtercard. As transceiver 514 is for providing LTE UE functionality, in effect emulating a user equipment, it may be connected via the same or different PCI-E bus, or by a USB bus, and may also be coupled to SIM card 518. First transceiver 512 may be coupled to first radio frequency (RF) chain (filter, amplifier, antenna) 522, and second transceiver 514 may be coupled to second RF chain (filter, amplifier, antenna) 524.

SIM card 518 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 512 and 514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 530 may also be included, and may be in communication with a GPS antenna 532 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 532 may also be present and may run on processor 502 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 6:
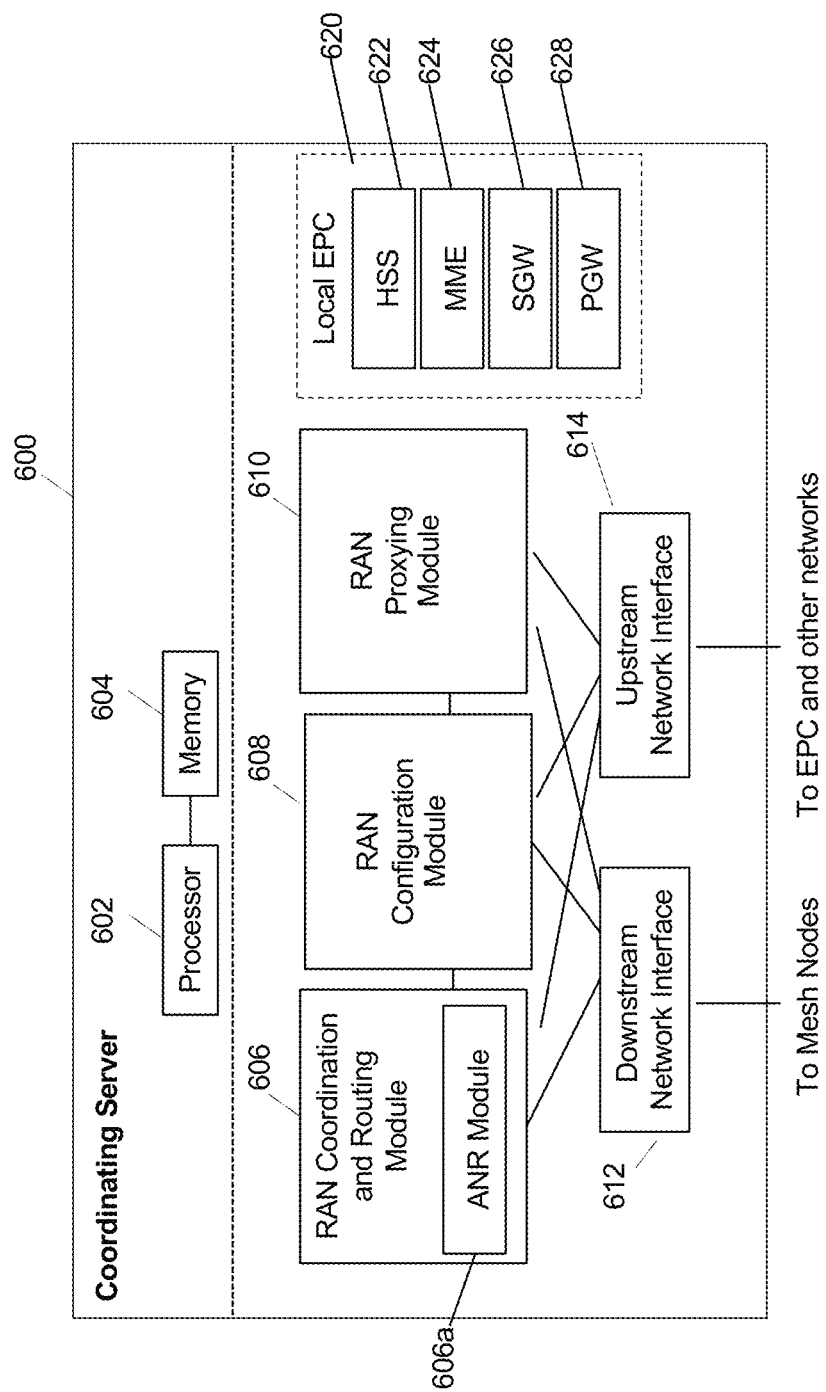
FIG. 6 is a coordinating server for providing services and performing methods as described herein, in accordance with some embodiments.

FIG. 6 is a coordinating server for providing services and performing methods as described herein, in accordance with some embodiments. Coordinating server 600 includes processor 602 and memory 604, which are configured to provide the functions described herein. Also present are radio access network coordination/routing (RAN Coordination and routing) module 606, including ANR module 606a, RAN configuration module 608, and RAN proxying module 610. The ANR module 606a may perform the ANR tracking, PCI disambiguation, ECGI requesting, and GPS coalescing and tracking as described herein, in coordination with RAN coordination module 606 (e.g., for requesting ECGIs, etc.). In some embodiments, coordinating server 600 may coordinate multiple RANs using coordination module 606. In some embodiments, coordination server may also provide proxying, routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet).

Coordinator 600 includes local evolved packet core (EPC) module 620, for authenticating users, storing and caching priority profile information, and performing other EPC-dependent functions when no backhaul link is available.

Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

For simplicity reasons, we are referring to a single process/task/container in any pods in this disclosure, but multiple processes/tasks/container per pod could be used as well with nominal changes to the present disclosure. In some embodiments, the controller may be colocated at the same physical location as the containers. In some embodiments, the controller may use Kubernetes cloud orchestration, Docker swarm, or equivalent. Provisioning, deployment, scaling (up and down), networking, load balancing, and/or other functions may be provided by the controller. One or more controllers may be used. In some embodiments, orchestration may occur across multiple clouds, including public, private, and on-prem clouds.

In the present disclosure, a microservice architecture can be used for implementing various network infrastructure nodes, such as, for example, a CU-UP, an AMF, an SMF, a UPF, an EPC MME, etc. or any other node in a telecommunications core network or in a cloud portion of a telecommunications radio network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for providing singleton micro-service high availability in a telecommunications network, comprising:
   providing a front-end microservice for terminating an inbound telecom interface;
   providing a plurality of back-end microservices acting as worker pods;
   providing an internal controller for monitoring the health of the front-end microservice and the plurality of back-end microservices;
   identifying, by the internal controller, that the front-end microservice has crashed;
   initiating, by the internal controller, a label change for an existing similar pod labeled as standby to active;
   matching a singleton micro-service selector label criterion;
   advertising the newly re-labeled existing similar pod as part of a singleton micro-service; and
   receiving, by the newly relabeled pod in the telecommunications network, traffic directed on an IP address of the singleton micro-service.

2. The method of claim 1, wherein the inbound telecom interface is an E1 interface with a CU-UP node in a telecommunications network.

3. The method of claim 1, wherein the inbound telecom interface is an NG interface with one or more of an AMF node and an SMF node in a telecommunications network.

4. The method of claim 1, wherein a database handles registration of the front-end microservice and the plurality of back-end microservices.

5. The method of claim 1, further comprising using a selector that is a free text field that accepts key-value pairs, the selector including a value that indicates that the pod is selected as active.

6. The method of claim 1, further comprising using a selector that is a free text field that accepts key-value pairs, the selector having the value "active".

7. A non-transitory computer-readable medium, which, when executed by at least one processor, causes the at least one processor to perform steps, the steps further comprising:
   identifying, by an internal controller in a telecommunications network, the internal controller for monitoring the health of a front-end microservice and a plurality of back-end microservices, that the front-end microservice has crashed;
   initiating, by the internal controller, a label change for an existing similar pod labeled as standby to active;
   matching a singleton micro-service selector label criterion;
   advertising the newly re-labeled existing similar pod as part of a singleton micro-service; and
   receiving, by the newly relabeled pod in the telecommunications network, traffic directed on an IP address of the singleton micro-service,
   wherein the front-end microservice is for terminating an inbound telecom interface; and
   wherein the plurality of back-end microservices act as worker pods.

8. The non-transitory computer-readable medium of claim 7, wherein the inbound telecom interface is an E1 interface with a CU-UP node in a telecommunications network.

9. The non-transitory computer-readable medium of claim 7, wherein the inbound telecom interface is an NG interface with one or more of an AMF node and an SMF node in a telecommunications network.

10. The non-transitory computer-readable medium of claim 7, wherein a database handles registration of the front-end microservice and the plurality of back-end microservices.

11. The non-transitory computer-readable medium of claim 7, the instructions further comprising using a selector that is a free text field that accepts key-value pairs, the selector including a value that indicates that the pod is selected as active.

12. The non-transitory computer-readable medium of claim 7, the instructions further comprising using a selector that is a free text field that accepts key-value pairs, the selector having the value "active".

13. A system, comprising:
   a front-end microservice for terminating an inbound telecom interface, in a telecommunications network;
   a plurality of back-end microservices acting as worker pods, in the telecommunications network; and
   an internal controller for monitoring the health of the front-end microservice and the plurality of back-end microservices, in the telecommunications network,
   wherein the internal controller further comprises instructions that, when executed by a processor, causes the internal controller to:

identify that the front-end microservice has crashed;
initiate a label change for an existing similar pod labeled as standby to active;
match a singleton micro-service selector label criterion; and
advertise the newly re-labeled existing similar pod as part of a singleton micro-service,
thereby causing the newly relabeled pod in the telecommunications network to receive traffic directed on an IP address of the singleton micro-service.

14. The system of claim 13, wherein the inbound telecom interface is an E1 interface with a CU-UP node in a telecommunications network.

15. The system of claim 13, wherein the inbound telecom interface is an NG interface with one or more of an AMF node and an SMF node in a telecommunications network.

16. The system of claim 13, further comprising a database for handling registration of the front-end microservice and the plurality of back-end microservices.

17. The system of claim 13, further comprising using a selector that is a free text field that accepts key-value pairs, the selector including a value that indicates that the pod is selected as active.

18. The system of claim 13, further comprising using a selector that is a free text field that accepts key-value pairs, the selector having the value "active".

* * * * *